(12) United States Patent
Van Gerwen et al.

(10) Patent No.: US 12,133,534 B2
(45) Date of Patent: Nov. 5, 2024

(54) SYSTEM TO MOULD PRODUCTS FROM A FOOD MASS

(71) Applicant: GEA FOOD SOLUTIONS BAKEL B.V., Bakel (NL)

(72) Inventors: Hendrikus Petrus Gerardus Van Gerwen, Someren (NL); Joost Van Erp, Nuenen (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 528 days.

(21) Appl. No.: 17/616,291

(22) PCT Filed: Jun. 18, 2020

(86) PCT No.: PCT/EP2020/066979
§ 371 (c)(1),
(2) Date: Dec. 3, 2021

(87) PCT Pub. No.: WO2020/254503
PCT Pub. Date: Dec. 24, 2020

(65) Prior Publication Data
US 2022/0248694 A1     Aug. 11, 2022

(30) Foreign Application Priority Data
Jun. 19, 2019   (EP) .................................... 19181227

(51) Int. Cl.
*A22C 7/00*   (2006.01)
(52) U.S. Cl.
CPC ................................ *A22C 7/0069* (2013.01)
(58) Field of Classification Search
None
See application file for complete search history.

(56) References Cited

FOREIGN PATENT DOCUMENTS

| | | |
|---|---|---|
| CA | 2826801 A1 | 8/2012 |
| CN | 206104475 U | 4/2017 |
| CN | 107340725 A | 11/2017 |
| EP | 2253219 A2 | 11/2010 |
| EP | 2253219 B1 | 7/2019 |
| JP | H05-281756 A | 10/1993 |
| JP | 2000-084572 A | 3/2000 |
| JP | 2007-536927 A | 12/2007 |
| JP | 2014-509844 A | 4/2014 |
| JP | 2016-185146 A | 10/2016 |
| JP | 2018-512130 A | 5/2018 |
| WO | 2015/169812 A1 | 11/2015 |
| WO | 2016/146519 A2 | 9/2016 |
| WO | 2019/091972 A1 | 5/2019 |

OTHER PUBLICATIONS

Japanese Office Action dated Jan. 5, 2024, for Japanese patent application No. JP2022-537774A.
Chinese Office Action dated Jul. 19, 2022, for Chinese Application No. 202080043876.8.
Chinese Second Office Action dated Jan. 28, 2023, for Chinese Application No. 202080043876.8.
International Search Report and Written Opinion dated Jul. 23, 2020, for International Application PCT/EP2020/066979.
International Preliminary Report on Patentability dated Sep. 30, 2021, for International Application PCT/EP2020/066979.

*Primary Examiner* — Jyoti Chawla
(74) *Attorney, Agent, or Firm* — The Dobrusin Law Firm P.C.

(57) ABSTRACT

A system that includes: a production device, a cleaning apparatus, and conveyor means. The production device includes: a mould drum with cavities; a mass feed means for feeding food mass to the cavities; and a gas pressure source to force the products from the cavities. The cleaning apparatus connects to a cleaning fluid source and includes: a control system that controls cleaning of the mould drum; means to clean an outer circumference of the mould drum; means to move the mould drum and/or means to move the means to clean the outer circumference of the mould drum during the cleaning; a collection trough to collect the cleaning fluid, and a cover. The control device automatically controls the cleaning such that the cleaning of the outer circumference of the mould drum takes place while and/or after the cavities are rinsed.

12 Claims, 2 Drawing Sheets

SYSTEM TO MOULD PRODUCTS FROM A FOOD MASS

CROSS REFERENCE TO RELATED APPLICATIONS

This application is a U.S. National Phase of International Application No. PCT/EP2020/066979, filed on Jun. 18, 2020, which claims priority to EP 19181227.0 filed on Jun. 19, 2019, all of which are hereby incorporated by reference herein for all purposes.

FIELD

The present invention relates to a system for moulding products from a food mass comprising a production device with a mould drum, a mass feed means, a gas pressure source. The system also includes a mould drum cleaning apparatus.

BACKGROUND

It is known to utilize mould drums for moulding food products, particularly products for human consumption, such as meat products, meat replacement products, fish, dairy, potatoes and vegetable products and pet food. The moulding takes place in mould cavities, into which the food mass is pressed and from which the moulded product is released. Advantageously, the cavity is at least partially made from a porous material, so that the air in the cavity can be vented during filling and/or that the formed product can be released with a pressurized fluid. It has been prevented that the porous structure is be clogged by food mass during the moulding process and thereby reducing the product output of the mould member. Further it is important that all machinery, tools and parts used in the food processing industry will be cleaned regularly and in a sufficient manner in order to fulfill the hygienic demands.

Apparatus and methods to clean a mould member and specifically a mould drum are described for example in EP2253219 B1, which is in particular directed to mould members provided with at least partially porous sintered cavities. However, the cleaning method disclosed in this patent application is very long, which reduces the time in which the mould drum is available for production of moulded products.

SUMMARY

It was therefore the objective of the present invention to provide a mould drum that can be cleaned more efficiently.

The problem is attained with a System for moulding products from a food mass comprising a production device with:
  a mould drum with a multitude of product cavities in a multitude of rows, each cavity having a porous bottom- and/or sidewall the cavities in one row being connected with a passage, the passage extending preferably parallel to the center-axis of the drum from one front end, wherein, during production, the mould drum rotates relative to a frame from a filling position, in which the cavities are filled with the food mass to a discharge position, in which the formed products are removed from the cavities and wherein, for cleaning purposes, the mould drum is removable from the frame,
  a mass feed means for feeding the food mass to the product cavities in the filling position,
  a gas pressure source, which is connected to the passage in the discharge position, the gas being used to force the formed products out of the product cavity, the system comprising a mould drum cleaning apparatus being adapted to connect a cleaning fluid source to the passages to force for cleaning purposes a cleaning fluid through the passages and/or through the porous product cavity and comprising:
  a control system that controls the cleaning of the mould drum,
  means to clean the outer circumference of the mould drum,
  means to move the mould drum and/or means to move the means (12) to clean the outer circumference of the mould drum (1) during cleaning of the drum,
  a collection trough to collect the cleaning fluid,
  a cover, so that cleaning of the mould drum takes place in a closed chamber, the system further comprising conveyor means to transport the mould drum between the production device and the cleaning apparatus,
  wherein the control device automatically controls the cleaning of the mould drum such that the cleaning of the circumference of the mould drum takes place at least partially while and/or after the porous cavities are rinsed with a cleaning fluid.

The present invention relates to a system for moulding products from a food mass comprising a production device with:
  a mould drum with a multitude of product cavities in a multitude of rows, each cavity having a porous bottom- and/or sidewall the cavities in one row being connected with a passage, the passage extending preferably parallel to the center-axis of the drum from one front end, wherein, during production, the mould drum rotates relative to a frame from a filling position, in which the cavities are filled with the food mass to a discharge position, in which the formed products are removed from the cavities and wherein, for cleaning purposes, the mould drum is removable from the frame,
  a mass feed means for feeding the food mass to the product cavities in the filling position,
  a gas pressure source, which is connected to the passage in the discharge position, the gas being used to force the formed products out of the product cavity,
  the system comprising a mould drum cleaning apparatus.

The disclosure made regarding this embodiment of the present invention also applies to other embodiments and vice versa. The disclosure made regarding this subject matter of the present invention can be combined with other subject matters of the present invention.

The present invention relates to a system comprising a mould drum with a multitude of product cavities at its circumference, provided in a multitude of rows, each row extending preferably parallel to the longitudinal center axis of the drum. The drum and the cavities can be made of any material or combination of different materials that have sufficient strength to withstand the mechanical forces occurring during the moulding process. Furthermore, the material must be acceptable for the food production. Plastic, like PE, PET, UHMW-PE at least for the porous structure is a possible material. Preferably, each cavity comprises an at least partially porous bottom wall and/or an at least partially porous sidewall. Each cavity is, during production of moulded products, connected to a fluid passage which is connected to the ambient, to a pressure source or to a vacuum and which fluid passage extends from one front end of the mould drum, preferably from the first front end to the second front end, in longitudinal direction of the mould drum, i.e. preferably parallel to the center axis of the drum. Depending on the design of the mould drum, further channels can be provided which connect the passages to the individual cavities. Each channel is designed to carry a gas a liquid and/or a mixture of both.

During production of moulded products, the drum rotates in the food forming apparatus and the at least partly porous cavities will be filled with food mass. Via the porous structure and fluid passage connected to the cavities which are filled, venting of the cavities, as a result of pressure applied to the meat and/or vacuum, to the ambient can take place with result that the formed products are free of air pockets and/or that each cavity is completely filled with food product. During discharge of the formed products a compressed fluid, preferably air, can be forced through the passage and the porous structure of the product cavities to remove the formed products from the cavity. A cleaning fluid will be forced through the passages and porous structure during cleaning.

The mould cavities are preferably machined into a cylindrical porous structure or into a porous structure shaped as the segment of a ring. Both structures are described in detail in the publication WO 2015/169812, which is incorporated herewith by reference and is therefore part of the disclosure of the present invention. Before, after or while the cavities are machined into the porous material, the pores at the outer surface of the porous cylinder or the porous segment are closed, so that they are at least essentially gastight. During machining of cavities into the porous material, the pores are at least partially deformed, i.e. compressed and thereby closed and need to be at least partially reopened, so that air can escape through this layer for removal of the formed products or that a cleaning fluid can pass this surface layer. Preferably, the pore structure in the surface layer of the sidewall has a different flow resistance for an air- and/or a cleaning fluid flow than the pore structure of the surface at the bottom.

During production, the mould drum is positioned in a frame and rotates relative to this from a filling position, in which the cavities are filled with the food mass to a discharge position, in which the formed products are removed from the cavities. For cleaning purposes, the mould drum is removable from the frame.

The system further comprises a mass feed means for feeding the food mass to the product cavities in the filling position and a gas pressure source, which is connected to the passage in the discharge position, the gas being used to force the formed products out of the product cavity.

The mould drum is cleaned in a cleaning apparatus positioned remote from the food forming apparatus, so that the production of moulded products with another mould drum can continue while the respective mould drum is cleaned.

Hence, the system comprising a mould drum cleaning apparatus being adapted to connect a cleaning fluid source to the passages to force for cleaning purposes a cleaning fluid through the passages and/or through the porous product cavity. The cleaning fluid is preferably water, preferably warm water, which may comprise a detergent, a descaler and/or disinfectant. The cleaning apparatus further comprises means to clean the outer circumference of the mould drum, for example one or more nozzle(s), preferably provided at as a spray bar. The nozzles may be stationary relative to the frame or may rotate. The fluid discharged from each nozzle may be steady state or change according to a pattern, preferably controlled by a control system disclosed below.

A collecting trough is provided to collect the cleaning fluid discharged from the means to clean the outer circumference of the mould drum and/or from the mould cavities. The cleaning fluid is preferably recycled. For recycling, the cleaning fluid is preferably cleaned, for example filtered. Fresh water and/or fresh detergent can be added to the cleaning fluid.

A cover which assures that cleaning of the mould drum takes place in a closed chamber. Preferably, the cover comprises an inspection opening, for example a window.

The cleaning apparatus further comprises a control system that controls the cleaning of the mould drum. This control system may comprise PLC, a sensor and/or a timer. The control system preferably controls the movement of the drum and/or the movement of the means to clean the outer circumference of the mould drum, preferably the spray bar, the means to clean the outer circumference of the mould drum and/or the cleaning fluid source.

During cleaning, the drum rotates and/or is in a standstill position. For cleaning of the outer circumference of the drum, preferably a spray bar with a multitude of nozzles is utilized. Whether the drum rotates during cleaning or not determines whether the spray bar is rotating and/or in a standstill position. In order to clean the porous structure, a cleaning fluid can be direct to each passage separately or to all passages at once in order to reduce cleaning time. The latter can be done by a distributor inside the cleaning apparatus and/or inside the drum. From each passage, the cleaning fluid passes the porous structure around each porous cavity and then exits the cavity and flows into the collecting trough.

During production, the food mass is forced into the cavity of the mould member drum. Hence, the pores of the porous structure are clogged from the outside to the inside. During discharge of the formed food products, the discharge fluid, mostly air, will be directed from the inside to the outside and will help in restore the permeability of the porous structure. Nevertheless, the porous structure has to be cleaned from food particles, proteins, other undesirable substances/particles and/or a biofilm, including the biofilm adhering to the outer surface of the porous structure as well as to all internal surfaces across the thickness of the porous structure in order to prevent colonization and growth of bacteria. Biofilm is a film that sticks to surfaces and composed of both organic residues and multiplying microorganisms. It is formed by bacteria present even in purified water which bacteria adhere to the pore surfaces.

Due to the open pore structure the entire surface area between the pore surface and biofilm is large. Only after cleaning and removal of the entire biofilm the surfaces can be successfully disinfected.

According to the invention, the control device automatically controls the cleaning of the mould drum such that the cleaning of the circumference of the mould drum takes place at least partially while and/or after the porous cavities are rinsed with the cleaning fluid. Preferably, first the rinsing of the cavities starts and then the cleaning of the outer circumference takes place, which more preferably is ended, before the rinsing of the cavities is finalized. This preferred embodiment of the present invention is faster than the system according to the state in the art. Particles, which are removed from the cavities are flushed away by the cleaning liquid utilized for cleaning the circumference.

The sequence of the cleaning steps and their duration is controlled by the control system. The control system also sets the mould drum and/or the spray bar into rotation and/or lifts the mould drum if needed. The control system preferably comprises a storage unit in which at least one cleaning program is stored, which is then applied for a certain mould drum. Preferably, there are multiple cleaning programs for different applications and/or for different degrees of dirtiness of the mould drum. The cleaning program can be dependent on the hours of usage of the mould drum and/or the number and/or the kind of cleaning cycles and cleaning agents/chemicals that the mould drum has been exposed to.

Thereafter, air under pressure above atmospheric pressure can be used to dry the passages. The air preferably flows via the passages and then through the porous structure of the mould drum in order to dry the passages and the porous structure of the entire drum.

Preferably, the system comprises means to monitor the progress of the cleaning. This means can be a camera which is combined with an image analysing system that determines, preferably in real time, the degree of dirtiness of the drum and more preferably adapts the cleaning process accordingly. The means can also be a system that counts bacteria at the surface of the mould drum and more preferably adapts the cleaning process accordingly.

Preferably, the passages and/or the porous product cavities are connected to a bacteriostatic source. The connection to this source is preferably executed after the rinsing of the porous cavities with the cleaning fluid has taken place and more preferably automatically by the control system.

According to another inventive or preferred embodiment of the present invention, each porous cavity comprises a porous bottom wall and a porous sidewall and that the cleaning fluid flow through the porous sidewall and through the porous bottom wall is different.

The disclosure made regarding this embodiment of the present invention also applies to other embodiments and vice versa. The disclosure made regarding this subject matter of the present invention can be combined with other subject matters of the present invention.

This embodiment of the present invention has the advantage, that even though the porous cavity is connected to one cleaning fluid source, the sidewall and the bottom wall can be rinsed with a different cleaning fluid flow rate and hence a different intensity. Preferably the flow rate through the sidewall and the bottom wall can be adjusted by the degree the pores are reopened after the machining of the cavity into the porous material. As already mentioned, during machining of the cavities into the porous material, the pores at the surface layer of the cavities are plastically deformed and are hence at least partially closed and need to be reopened. The surface layer of the sidewall and the bottom wall are now reopened such that the flow rate of the cleaning fluid through the sidewall is different form the flow rate through the bottom wall. Preferably, the flow rate through the sidewall is less than the flow rate through the bottom wall.

Preferably, the flow resistance of the porous sidewall is different than the flow resistance of the porous bottom wall. Due to the difference in the flow resistances for the cleaning fluid flow, the fluid flow through the sidewall and through the bottom wall are different.

Preferably, the sidewall and the bottom wall are machined and/or reopened differently. Different machining and reopening can even be achieved with the same tool and/or the machining parameters.

Another subject matter of the present invention is a method to clean a mould drum with a multitude of product cavities in a multitude of rows, each cavity having a porous bottom- and/or sidewall the cavities in one row being connected with a passage, the passage extending preferably parallel to the center-axis of the drum from one front end, wherein a control device is provided, which automatically controls the cleaning of the mould drum such that the cleaning of the circumference of the mould drum takes place while and/or after the porous cavities are rinsed with the cleaning fluid.

The disclosure made regarding this embodiment of the present invention also applies to other embodiments and vice versa. The disclosure made regarding this subject matter of the present invention can be combined with other subject matters of the present invention.

This invention relates to a method to clean a mould drum for producing moulded food products. The food product is moulded in cavities, which have at least partially a porous structure. Each cavity is connected to a passage that preferably extends preferably parallel to the longitudinal rotational axis of the drum. The passage extends until at least one front end of the drum.

Preferably, the passages and the porous structures are cleaned by a so-called backward flushing, i.e. the cleaning material flows from one front end of the drum through the porous structure to the ambient and from there preferably into the trough.

The cleaning process can be finished by drying the mould member.

In a preferred embodiment, the drum is at least partially submerged in a cleaning liquid. This cleaning method is preferably applicable for fragile drums and/or fragile porous structures and/or drums with an axial length greater than 600 mm. During cleaning, the drum can be moved, preferably rotated in the cleaning liquid. A fluid flow through the passages and the pores of the porous structure as described can be utilized. A further advantage of a submerged mould drum will be that the entire drum will at least essentially the same temperature e.g. be heated more or less evenly. In a cleaning embodiment using backward flushing as main cleaning method, pumping a heated fluid via a passage through at least a partially porous structure can result in temperature difference and therefore thermal stress between the several parts out of which the drum is designed (inner parts versus outer parts drum), the difference in coefficients of expansion of the used materials will result in additional thermal stress. Therefore, it is preferred that the cleaning fluid is also provided to the inside of the mould drum.

Preferably, particularly when the drum is not submerged in a cleaning fluid, all passages will be provided with a cleaning fluid simultaneously to prevent further thermal stress between different spots of the mould member. In a submerged mould drum, all parts are provided with fluid at once.

All kind of cleaning processes can be used related to an at least partially submerged drum. In one embodiment, the mould drum will be soaked in chemicals, a detergent, preferably in liquid form or as a foam, for a predetermined period of time such that the adhesion forces between the pore surfaces and trapped particles etc. will be removed and the particles etc. will be dislodged. In a preferred embodiment, the cleaning liquid in the tank will be under pressure such to assure that the liquid will fill all pores across the entire thickness of the porous structure. This pressure can be due to gravity, but the entire tank in which the drum is at least partially submerged can also be set under pressure.

In a final step the mould drum can be dried with gas, preferably air, for example via backward flushing and/or by heating the entire drum, preferably for a predetermined period of time.

Preferably, peracetic acid is used as a cleaning agent.

The fluid pressure and temperature used to clean the porous mould member will mainly depend on the material to be used. In case of a stainless steel porous structure the pressure of the cleaning fluid is preferably maximum 4 bar and the temperature maximum 90° C. Especially the temperature is depending on the kind of cleaning agent to be used and will preferably be 70° C. to prevent that the porous structure will be treated too aggressive. In case of a plastic porous structure the fluid pressure used to clean the porous mould member will be maximum 1 bar but preferably maximum 0.5 bar above ambient pressure at the entrance of the passages. The temperature of the cleaning fluid will preferably not exceed 40° C. but preferably 30° C.

Preferably, a after cleaning, rinsing, preferably with bacteria-free water takes place. Thereafter the mould drum can be dried in a final step preferably by air via backward flushing or by warm up the entire drum during a predetermined period of time.

Preferably the permeability of a cleaned mould member will be validated right after finishing the cleaning process. This can for example be done with a vision system that checks the surface for example of the mould cavity and/or by measuring the pressure drop of a gas and/or fluid-flow at a certain velocity and/or temperature, preferably measured with a constant air-flow. Several pressure sensors can be included in the drum, so that local differential pressures can be measured and an insufficiently cleaned area can be located. A pressure sensor can be installed at the entrance of the mould drum to measure the overall flow resistance of the cleaning fluid and/or an air-flow over one or multiple row(s) of cavities or the entire drum.

Cleaning should be performed in case the permeability is not within a certain range in order to prevent bacterial growth in case the mould member is in storage and/or rapid clogging of the pores of the porous structure as soon as the drum is back into production.

The cleaning fluid can be filtered and be recycled.

Beneficial in the cleaning procedure of the mould drum is to know when and to be sure that the drum is clean and to know that when and that the porous structure is open and clean. This assures on the one hand that the cleaning process is not unnecessary extended and on the other hand that the drum and the porous structure of the mould cavities is sufficiently clean. According to a preferred or inventive embodiment of the present invention, the cleaning process is adapted and/or controlled by a control step wherein the flow resistance of the porous structure of at least one cavity in one row of cavities, preferably the flow resistance of one entire row of cavities and even more preferably in each row of cavities of the drum is measured and compared to a reference value and/or analysed over time. As long as the flow resistance, which can be for example measured according to the pressure needed to achieve a certain cleaning fluid- or air-flow rate and/or the pressure drop over the porous structure and/or the pressure before the porous structure is not reduced to a certain pressure drop, preferably the pressure drops of the new drum, the cleaning process is not terminated. According to another preferred or inventive embodiment or an even more preferred embodiment, the initial pressure drop is measured and the cleaning process, for example its duration and/or the temperature of the cleaning fluid and/or the cleaning substance used is selected.

In case the change of the pressure drops over the porous structure is monitored over time, preferably the cleaning is not terminated as long as the pressure drop of the porous structure still decreases and/or the cleaning method, e.g. temperature of the fluid, its pressure and/or the cleaning substance is changed. Preferably, each row can be cleaned individually. In this case the above said applies for each row. In this case, one row can be cleaned more intensely than another row of porous material of the drum. The pressure drop can be measured before and/or after the porous structure has been dried.

During the cleaning process a fluid source, for example water and/or cleaning detergent is pumped via passages through the porous structure of the drum. Pressure and/or flow of the fluid source will be monitored, preferably continuously, during the cleaning process. This data can be stored. The longer the cleaning process takes, the more the pressure will decrease and/or the flow will increase until a final value, the value when the drum is clean, is reached. Practice has shown, that this value can be a dependent on the drum configuration, e.g. number of rows, number of cavities, the shape of the cavities, the thickness of the porous material etc.

Before using the drum, a first time in production, preferably a reference measurement of the pressure drop of the drum and/or the pressure of the cleaning fluid to achieve a certain air- or cleaning liquid-fluid flow through one or more passages or all passages of the drum and the respective connected porous cavities should be made and the data should be stored individually for every drum and used as reference values. Preferably, his value reflects the properties of the porous material, for example the pore size, porosity, and/or the drum configuration, e.g. number of rows, number of cavities, the shape of the cavities and/or the thickness of the porous material. These values can be the reference values to determine later on if a drum is open, i.e. if the porous structure and/or the fluid passages in the drum are sufficiently clean. This reference value can be measured for at least one cavity in one row of cavities, for an entire row of cavities and even more preferably measured for each row independently and are then stored individually for every row of each drum.

The cleaning program, cleaning results, reference measurement pressure and/or flow and monitored pressure and/or fluid flow values can be stored in the cleaning apparatus where a drum is cleaned and/or in a central data storage and/or in a storage, for example an RFID on the drum. The cleaning program can comprise data which detergent and/or the amount of that specific detergent is needed within a, preferably each and every, cleaning step and the time period of a, preferably each and every, cleaning step. Preferably the cleaning program will not be started in case of a critical level of water pressure and/or one of the detergent levels. In case that during cleaning water pressure and/or one of the detergent levels approach a critical level the cleaning process can be proceeded and the time periods and amount of used detergents together with a notification that too little of a specific detergent is used during cleaning will be registered as part of the cleaning results. However, preferably the cleaning program will be stopped and/or an alarm will be activated, preferably until the correct level of detergent in the storage tank is provided.

In case the drum has a data storage element, for example an RFID, the drum can be recognized in the forming apparatus and/or in the cleaning apparatus. To the history of the previous cleaning such as cleaning program and/or cleaning result, reference measurement of pressure and/or fluid flow and/or the monitored pressure and/or fluid flow values can be added. The cleaning results can include measurements and alarms during the cleaning program such that it can be determined afterwards if there were cleaning issues with a certain mould drum.

The cleaning history can be stored on the storage element of the drum or the apparatus in which the drum is cleaned. When using multiple cleaning apparatus preferably the history will be stored preferably additionally in a central data system to prevent that the storage element of a certain drum will not be updated well or will be out of memory.

The pressure and/or flow of the cleaning-fluid source can be monitored, preferably continuously, during the cleaning process. The longer the cleaning process takes, the more the pressure will decrease and/or the flow will increase until a final value, the value when the drum is clean, is reached. By continuously monitoring the pressure and fluid flow of the fluid source it is even possible to stop the cleaning process already when the pressure and flow reaches desired values. On the other hand, when at the end of the cleaning process the desired values of pressure and/or flow is not reached, the cleaning process can be extended until the desired values are reached.

Preferably, the cleaning program comprises multiple cleaning steps. A possible cleaning program can comprise one or more of the following steps: Rinsing cavities with cold water, cleaning cavities with a detergent, rinsing outer circumference drum, rinse cavities and outer circumference drum, clean cavities with disinfectant, rinse cavities and outer circumference drum, drying drum with a gas preferably air.

Preferably, after each and every cleaning step within the cleaning program the result will be measured, validated and the control system will decide to start the next cleaning step or to proceed with the current cleaning step in order to achieve the desired cleaning results. By continuously monitoring the pressure and fluid flow of the fluid source it is even possible to, as the pressure and flow reaches desired values, stop the cleaning during a cleaning step, skip the cleaning step and proceed with the next cleaning step. as the pressure and flow reaches desired values. to skip the current cleaning step and proceed with the next cleaning step.

All pressure drop of fluid flow measurements are preferably executed with a mould drum whose outer circumference is closed, so that no or little air and/or cleaning fluid can escape via this surface of the mould drum. Only the porous material in the cavities is permeable.

Preferably, the system comprises an anti-limescale system, for example comprising magnets creating a magnetic field. Preferably, Calcium- and Magnesium minerals will not be removed but will not crystallize. Hence, lime will no longer adhere to equipment and/or tooling, no hard lime layer will be formed within the waterlines of the cleaning apparatus and inside the porous structure of the mould drum. This prevents the use of a descaler step and will shorten the cleaning procedure.

In a preferred embodiment of the invention a cleaning step within the cleaning process can be performed with plasma activated water (PAW). PAW has excellent antibacterial and anti-biofilm properties, reference will be made to WO2019091972 which describes the cleaning of food processing equipment with PAW including a drum comprising at least partially a porous structure. For instance, the disinfection step can be replaced by a plasma activated step, no chemicals and only a limited amount of water will be needed. PAW can also be applied in a final rinsing step. WO2019091972 is hereby incorporated by reference, so that its disclosure is part of the present disclosure. PAW can be produced outside the cleaning apparatus, in another embodiment the cleaning apparatus comprises a device for producing PAW and/or a reservoir for storing PAW and/or has an atmospheric-pressure plasma device to produce PAW.

In another preferred embodiment of the invention the cleaning apparatus comprises at least one conductivity sensor, depending on what to measure the sensor can be positioned within a water tank and/or a chemical tank and/or a collection trough and/or at the entrance of the drain pipe/drain system and/or further downstream within the drain pipe/drain system.

At least one conductivity sensor can be used to dose chemicals and/or chemicals with water in the correct compositions. By (pre)dosing with a conductivity sensor the cleaning process can be shortened.

In a further preferred embodiment of the invention at least one conductivity sensor can be used to verify the cleaning process, for instance by measuring the conductivity of rinse water/flush water it can be verified if the rinse water/flush water still comprising chemical residues, detergent residues and contamination. The at least one conductivity sensor should be positioned within the rinse water/flush water drain system. In case of real time monitoring, by apply this verification the specific cleaning step in the cleaning process will be stopped in case is measured that the rinse water/flush water is sufficient clean. This results in a rinsed mould drum free from detergent/disinfectant residues and contamination and a cleaning step with the cleaning process which use limited water and takes no more time than needed.

Beside for rinse water/flush water a conductivity measurement can be applied to check if sufficient cleaning agent (detergent, disinfectant, etc.) is used. The measured value can be inputted in a control unit to be able to control the cleaning process, for instant stop cleaning if not sufficient cleaning agent is available.

Preferably all measurements and resulting alarms and control interventions will be stored in a memory. Conductivity sensors to verify cleaning fluid in order to control/adjust the cleaning process can be applied within/after individual cleaning steps and/or at the final cleaning step within the cleaning process.

In another embodiment of the invention the cleaning apparatus comprises at least one pH sensor, depending on what to measure the sensor can be positioned within a water tank and/or chemical tank and/or collection trough and/or at the entrance of the drain pipe/drain system and/or further downstream within the drain pipe/drain system.

The pH sensor can be used with similar applications as described above for the conductivity sensor; dosing, measuring/analysing rinse water/flush water, if sufficient cleaning agent is used, etc.

In a further embodiment a cleaning apparatus comprises a combination of at least one conductivity sensor and at least one pH sensor, depending on what to measure the sensors can be positioned within a water tank and/or chemical tank and/or collection trough and/or at the entrance of the drain pipe/drain system and/or further downstream within the drain pipe/drain system, the at least two sensors can be used for the same task and/or for different tasks such that measurements/analysis will be as reliable as possible.

BRIEF DESCRIPTION OF THE FIGURES

The inventions are now explained according to FIGS. 1-3. These explanations are only exemplary and do not limit the scope of protection.

DETAILED DESCRIPTION

Figure 1:
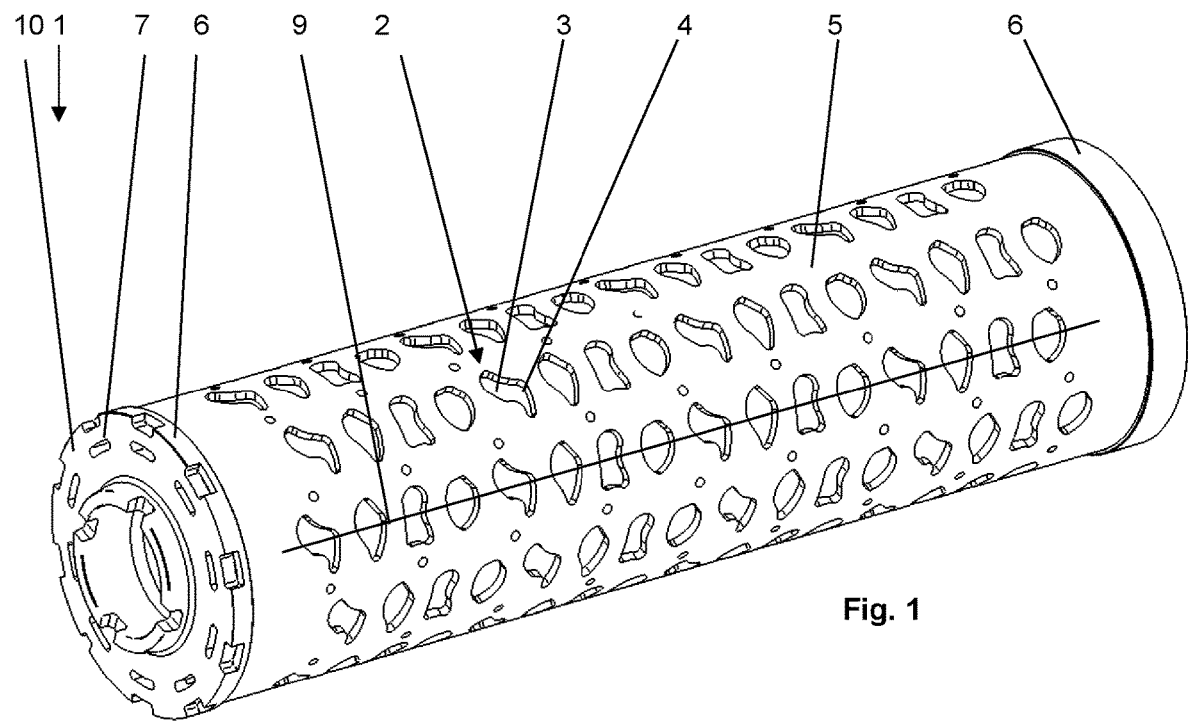
FIG. 1 is a perspective view of a mould member.

FIG. 1 shows a mould member, in this case a mould drum 1 which is in this embodiment provided with end-caps 6. Product cavities 2 are arranged around the circumference of the drum and open out towards the surface. In its axial extension, the mould drum comprises rows each with a multitude of cavities which are in this embodiment of the drum arranged in parallel. Every individual cavity in a row of cavities is via the porous structure in fluid contact with a passage 7. In the present case one row of cavities comprises sixteen cavities which are filled simultaneously and discharged simultaneously. At least the bottom wall 3 of cavities 2 but preferably also the sidewall 4 will be made of a porous material, preferably sintered metal or plastic. The outer cylindrical circumference 5 of the mould drum is closed to prevent penetration of food mass in the porous structure during filling and to improve discharge of formed food products from the cavities 2.

Figure 2:
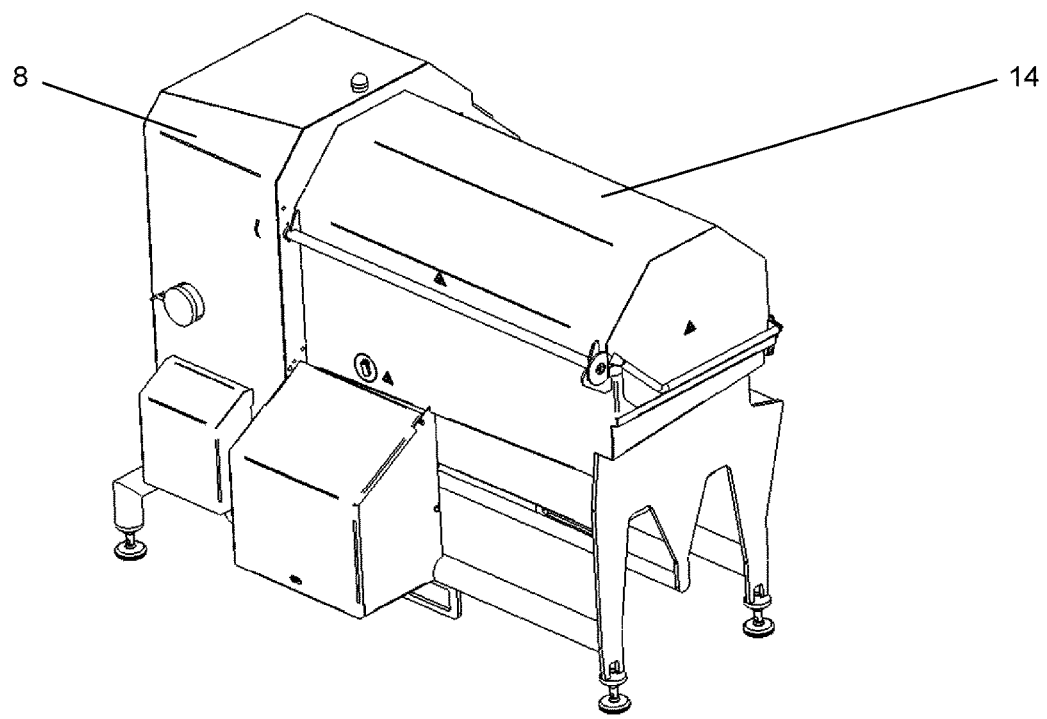
FIG. 2 is a perspective view of the cleaning apparatus.
Figure 3:
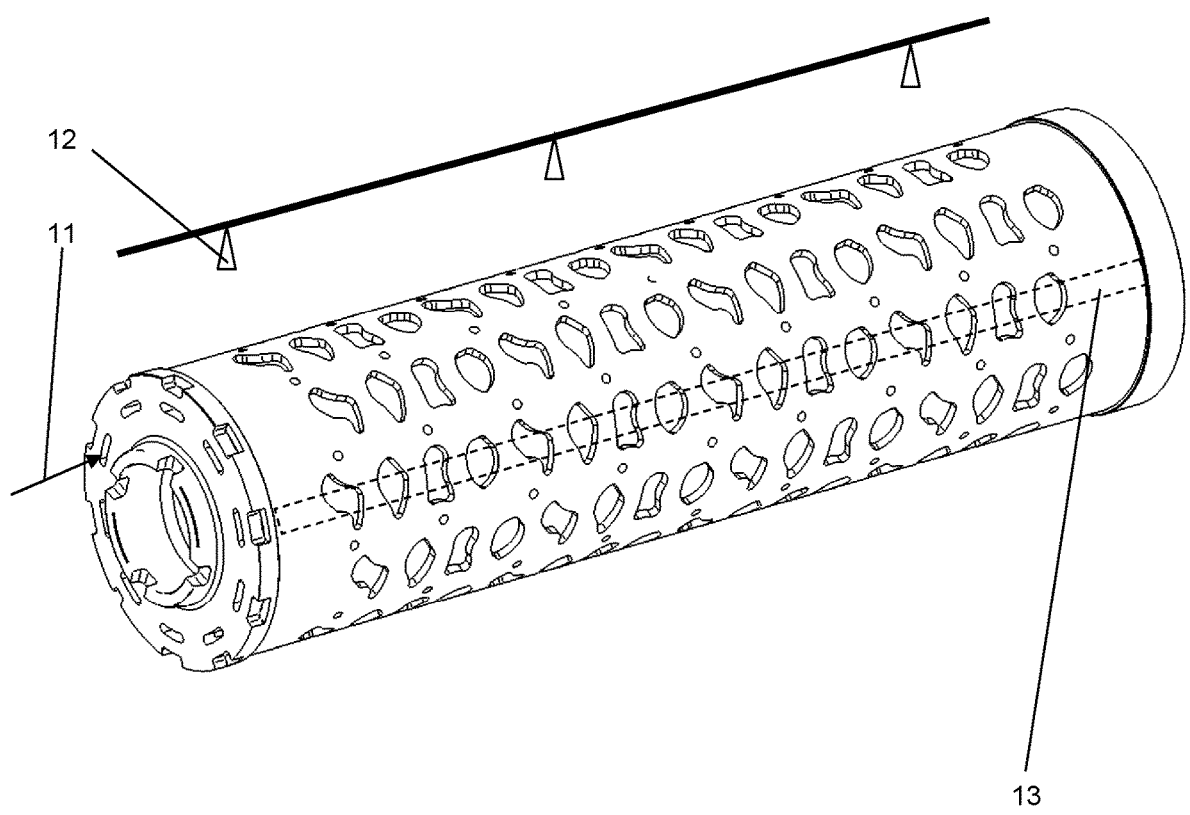
FIG. 3 is a perspective view of a mould member and surface cleaning means.

FIG. 2 shows a first embodiment of the cleaning apparatus 8. This cleaning apparatus comprises a support frame, which is designed in the present case as a partial segment of a cylindrical tube. Into this support frame, the mould drum is placed. On each side, the inventive cleaning apparatus comprises cover- and fastening means which can be axially movable. After the drum, has been placed into the support frames, the cover- and/or fastening means are moved towards the drum, until they are in contact with the respective front end, so that the cleaning takes place in a closed chamber. Drive means, preferably motor drive means can be utilized for this movement particularly in order to automatize the cleaning process. The person skilled in the art understands, however, that the means can also be moved manually. At their contact side with the drum, each cover- and/or fastening means comprises sealing means in order to avoid undesired leakage particularly cleaning- and/or drying-fluid leakage between the drum and the cover. During cleaning, the mould drum can be stationary and a surface cleaning means, here a spray bar with a multitude of nozzles, rotates around the drum. The surface cleaning means (FIG. 3) can be motor driven and/or can be rotated by the impulse of the jet that emerges each nozzle. Alternatively, the spray bar is stationary and the drum rotates. The cleaning fluid sprayed on the outside of the drum cleans the surface of the drum and the surface of the cavity, preferably removes coarse debris like meat or fat particles.

Furthermore, the cover- and/or fastening means comprises a cleaning fluid and/or gas connection. Via this cleaning fluid connection/cleaning fluid source, a cleaning fluid and/or a gas is introduced into the cover and flows as a single- or two-phase-flow from there to a distribution means, which is connected to all passages of the mould drum. Thus, the passages and/or the porous structure of the cavity can be cleaned simultaneously. However, it is also possible to connect the cleaning fluid source row by row with the mould drum. The cleaning apparatus has a trough in which the cleaning fluid is collected. Preferably the cleaning fluid is recycled. Therefore, a pump is provided which pumps the cleaning fluid from the trough through the passages 7, 13 and mould cavities 2 and/or through the surface cleaning means 12. Preferably a filter is provided to filter the cleaning liquid before or while it is recycled. Fresh cleaning liquid can be added to the cleaning process continuously or intermittently and used cleaning fluid can be discharged to a waste water treatment plant. Heating means can be provided to heat the cleaning fluid.

According to the present invention, the cleaning of the surface 5 of the mould drum is started after the rinsing of the passages 7, 13 and/or the rinsing of the porous mould cavities has started. This embodiment has the advantage, that particles in the cavities have been already flushed to the surface of the mould drum, before the cleaning of the surface of the drum with the means 12, preferably spray nozzles starts. Preferably, cleaning of the surface of the drum with the means 12 is terminated before the rinsing of the porous product cavities is terminated.

LIST OF REFERENCE SIGNS 1 mould drum
2 porous product cavities
3 porous bottom wall cavity
4 porous sidewall cavity
5 drum wall
6 end-cap
7 passages
8 cleaning apparatus
9 row of cavities
10 front end of the drum
11 cleaning fluid source
12 means to clean the outer circumference of the mould drum, spray nozzle
13 passage
14 cover

The invention claimed is:
1. A system -comprising:
A) a production device for moulding products from a food mass, the production device comprising:
  i) a mould drum with of product cavities in a multitude of rows, each of the product cavities having a porous bottom and/or sidewall, the product cavities in one row of the multitude of rows being connected with a passage, the passage extending parallel to a center-axis of the mould drum from one front end, wherein, during production, the mould drum rotates relative to a frame from a filling position, in which the product cavities are filled with the food mass to a discharge position, in which formed products are removed from the product cavities and wherein, for cleaning purposes, the mould drum is removable from the frame,
  ii) a mass feed means for feeding the food mass to the product cavities in the filling position,
  iii) a gas pressure source comprising a gas, which is connected to the passage in the discharge position, the gas being used to force the formed products out of the product cavities,
B) a mould drum cleaning apparatus adapted to connect a cleaning fluid source to the passage to force, for cleaning of the mould drum, a cleaning fluid through the passage and/or through the product cavities, the mould drum cleaning apparatus comprising:
  i) a control system that controls the cleaning of the mould drum,
  ii) means to clean the an outer circumference of the mould drum, iii) means to move the mould drum and/or means to move the means to clean the outer circumference of the mould drum during the cleaning of the mould drum, iv) a collection trough to collect the cleaning fluid, and v) a cover, so that the cleaning of the mould drum takes place in a closed chamber, C) conveyor means to transport the mould drum between the production device and the mould drum cleaning apparatus, wherein the control device automatically controls the cleaning of the mould drum such that the cleaning of the outer circumference of the mould drum takes place at least partially while and/or after the product cavities are rinsed with the cleaning fluid.

2. The system according to claim 1, wherein the mould drum is automatically rotated and/or lifted during the cleaning of the mould drum.

3. The system according to claim 1, wherein the system comprises means to monitor progress of the cleaning of the mould drum.

4. The system according to claim 1, wherein the system comprises means to dry the passage and the product cavities.

5. The system according to claim 1, wherein the passage and/or the product cavities are connected to a bacteriostatic source.

6. The system according to claim 1, wherein each of the product cavities comprise the porous bottom wall and the porous sidewall, and the cleaning fluid that flows through the porous sidewall and through the porous bottom wall is different.

7. The system according to claim 6, wherein a flow resistance of the porous sidewall is different than a flow resistance of the porous bottom wall.

8. The system according to claim 6, wherein the porous sidewall and the porous bottom wall are machined and/or reopened differently.

9. The system according to claim 1, wherein the system comprises at least one conductivity and/or one pH sensor, the at least one conductivity and/or one pH sensor is positioned within a water tank and/or chemical tank and/or the collection trough and/or at an entrance of a drain pipe/drain system and/or further downstream within the drain pipe/drain system.

10. A method to clean a mould drum with a multitude of product cavities in a multitude of rows, each of the multitude of product cavities having a porous bottom wall and/or sidewall, the product cavities in one row of the multitude or rows being connected with a passage, the passage extending parallel to a center-axis of the mould drum from one front end, wherein a control device is provided, which automatically controls cleaning of the mould drum such that cleaning of a circumference of the mould drum takes place while and/or after the product cavities are rinsed with a cleaning fluid.

11. The method according to claim 10, comprising a cleaning apparatus comprising at least one conductivity sensor and/or pH sensor positioned at an entrance of a drain pipe/drain system and/or further downstream within the drain pipe/drain system, and that in case is measured that the rinse water/flush water is sufficient clean the specific cleaning step in the cleaning process can be stopped.

12. The system according to claim 1, the control device automatically controls the cleaning of the mould drum such that the cleaning of the outer circumference of the mould drum takes place at least partially while the product cavities are rinsed with the cleaning fluid.

* * * * *